Feb. 2. 1932.   C. E. HANDEL   1,843,360
CABLE SPLICE
Filed April 21, 1931

Inventor
Charles E. Handel.
by Ornig & Hague Att'ys.

Patented Feb. 2, 1932

1,843,360

UNITED STATES PATENT OFFICE

CHARLES E. HANDEL, OF WINTERSET, IOWA, ASSIGNOR TO WEJ-LOCK MANUFACTURING COMPANY, OF WINTERSET, IOWA, A CORPORATION OF IOWA

CABLE SPLICE

Application filed April 21, 1931. Serial No. 531,748.

The object of my invention is to provide a cable clamp in which the body into which the cable is inserted to be clamped has both of its ends open, so that when the operator inserts the cable in the clamp he may readily and easily properly position the strands within the grooves on the interior of the body and within the grooves on the wedge, so that when the wedge is finally forced into clamping position, a perfect clamping action is effected in all instances.

More specifically it is my object to provide a detachable cap for a cable clamp of this character, which cap contains a screw for forcing the wedge into position, and which forms a closure for the large open end of the clamp body, so that the cable and the wedge may be properly positioned with relation to the strands, and then the detachable head may be applied and the screw turned to complete the clamping action upon the cable, and to completely cover and enclose the open end of the body.

My invention consists in the construction, arrangement and combination of the various parts of the device, whereby the objects contemplated are attained, as hereinafter more fully set forth, pointed out in my claims, and illustrated in the accompanying drawings, in which:

Figures 2, 3:
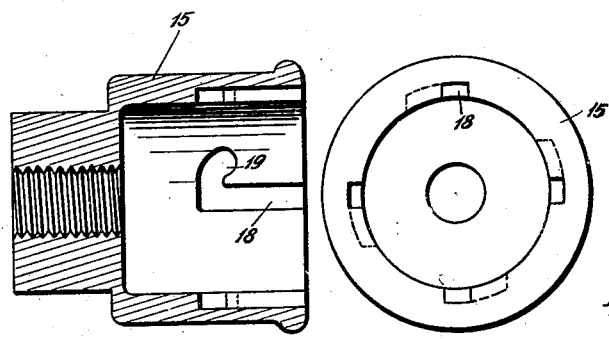
Figure 2 shows a longitudinal sectional view of the cap device.
Figure 3 shows an end elevation of the same looking toward the open end.
Figure 5:
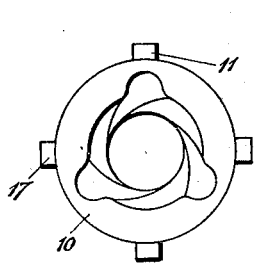
Figure 5 shows an end view of same looking toward the large end of the tapered opening.
Figure 4:
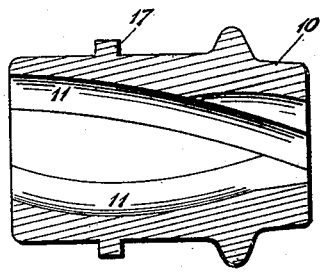
Figure 4 shows a longitudinal sectional view of the cable splice body.
Figure 6:
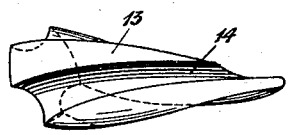
Figure 6 shows an isometric view of the wedge.

Referring to the accompanying drawings, I have used the reference numeral 10 to indicate the body portion of my improved cable splice. On the interior of the body portion there is a conical shaped opening in which is formed a series of helical grooves 11.

The cable to be clamped is indicated generally by the reference numeral 12, and in the present instance is shown as having three strands, each strand being composed of a series of wires.

The body 10 and the helical grooves therein are so arranged that the cable to be clamped may be inserted into the body through the small end of the recess, and then the cable strands forced outwardly to lie in the helical grooves 11.

Figure 7:
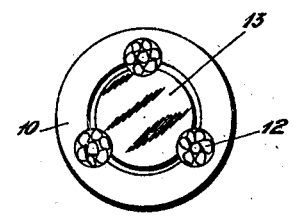
Figure 7 shows an end view of the splice body and wedge with the strands of the cable properly positioned in the grooves thereof.
Figure 1:
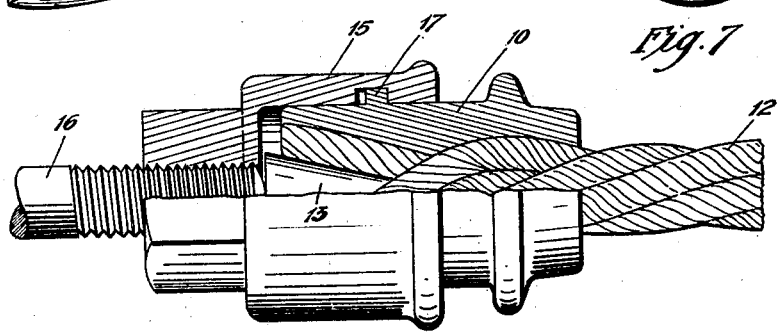
Figure 1 shows a side elevation partly in section of a device embodying my invention with a cable inserted in one end thereof and a clamp screwed in the other.

For the purpose of holding the strands in these grooves I have provided a wedge, indicated generally by the reference numeral 13, which wedge is formed with a series of helical grooves 14, and is so arranged that when the cable strands are in the helical grooves 11, the wedge may be inserted between the strands to clamp the strands between the body 10 and the wedge 13. The general arrangement of the body, wedge and strands is clearly illustrated in Figure 7.

Obviously, by having the body 10 open at both ends, the cable may be readily and easily inserted therein, and then the operator may place the wedge in position, and force it into position by a hammer or otherwise, and during this time if any of the cable strands should not be properly placed within its respective helical groove, the operator can readily and easily place it in such position.

For the purpose of permanently holding the wedge in proper position and for closing the large open end of the body portion 10, I have provided a cap indicated generally by the numeral 15, and capable of telescopically receiving the outer surface of the body 10, and in the end of the cap 15 I have mounted a screw 16 designed to engage the adjacent end of the wedge for forcing it in position between the strands of the cable, and for holding the wedge in position.

For detachably securing the cap 15 to the body 10 I have provided on the body 10 a series of outwardly extended lugs 17, and on the interior of the cap 15 I have provided a series of grooves 18 having right angle extensions 19 to co-operate with the lugs 17 in forming a bayonet joint.

It will be observed by reference to Figure 2 that the laterally extending portions of the grooves 18 are inclined toward the open end of the cap, and by this arrangement the cap is securely locked against rotation relative to the body when the screw 16 is in engagement with the wedge and pulling the cap in a direction away from the body 10.

In practical use, and after the body, cable and wedge have been assembled as before described, then the operator simply places the cap 15 in position and turns it so that the bayonet joint will be locked. Then the screw 16 is rotated to force the wedge more firmly in position between the cable strands, and at the same time applies such pressure to the cap as will prevent it from being rotated relative to the body 10 on account of the shape of the bayonet joint.

I claim as my invention:

1. A cable clamp comprising a body portion having a conical recess and open at both ends, the smaller end being designed to permit the insertion of the cable to be clamped, the interior of said body being formed with a series of helical grooves of substantially the same diameter and pitch as that of the strands of cable to be clamped, a wedge for forcing the strands of a cable into said grooves, a cap detachably secured to the end of said body adjacent to the large end of said recess, and means carried by the cap for holding the wedge in position.

2. A cable clamp comprising a body portion having a conical recess and open at both ends, the smaller end being designed to permit the insertion of the cable to be clamped, the interior of said body being formed with a series of helical grooves of substantially the same diameter and pitch as that of the strands of cable to be clamped, a wedge for forcing the strands of a cable into said grooves, a cap detachably secured to the end of said body adjacent to the large end of said recess, and means carried by the cap for applying pressure to the wedge.

3. A cable clamp comprising a body portion having a conical recess and open at both ends, the smaller end being designed to permit the insertion of the cable to be clamped, the interior of said body being formed with a series of helical grooves of substantially the same diameter and pitch as that of the strands of cable to be clamped, a wedge for forcing the strands of a cable into said grooves, said wedge being formed with helical grooves of substantially the same diameter and pitch as that of the strands of the cable to be clamped, a cap detachably secured to the end of said body adjacent to the large end of said recess, and means carried by the cap for holding the wedge in position.

CHARLES E. HANDEL.